United States Patent
Baccouche et al.

(10) Patent No.: US 11,254,240 B2
(45) Date of Patent: Feb. 22, 2022

(54) NETWORK OF RAILS FOR A VEHICLE

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Saied Nusier, Canton, MI (US); Jamel E. Belwafa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 16/204,233

(22) Filed: Nov. 29, 2018

(65) Prior Publication Data
US 2020/0171980 A1   Jun. 4, 2020

(51) Int. Cl.
*B60N 2/06* (2006.01)
*B60N 2/07* (2006.01)
*B60N 2/14* (2006.01)

(52) U.S. Cl.
CPC ............. *B60N 2/062* (2013.01); *B60N 2/065* (2013.01); *B60N 2/0715* (2013.01); *B60N 2/0737* (2013.01); *B60N 2/0745* (2013.01); *B60N 2/14* (2013.01)

(58) Field of Classification Search
CPC ...... B60N 2/0705; B60N 2/0818; B60N 2/06; B60N 2/0715; B60N 2/0875; B60N 2/067; B60N 2/0232; B60N 2/065
USPC ....... 296/65.13, 36.09, 65.15, 19, 63, 65.12, 296/65.18, 1.05, 193.07; 297/344.1, 297/344.11, 284.1, 115, 135, 145, 146, 297/354.13
See application file for complete search history.

(56) References Cited

U.S. PATENT DOCUMENTS

| | | | |
|---|---|---|---|
| 2,290,464 A * | 7/1942 | Buchheit | B60N 2/14 296/65.07 |
| 2,426,582 A | 11/1943 | Austin | |
| 3,486,204 A * | 12/1969 | Miller, Jr. | A47C 7/002 24/606 |
| 4,341,415 A | 7/1982 | Braun et al. | |
| 5,000,505 A | 3/1991 | Kawashita et al. | |
| 5,636,884 A | 6/1997 | Ladetto et al. | |
| 5,911,465 A | 6/1999 | Yamamoto et al. | |
| 5,951,106 A | 9/1999 | Hirama et al. | |
| 6,168,234 B1 | 1/2001 | Haynes et al. | |
| 6,457,765 B1 | 10/2002 | Bergquist et al. | |
| 6,557,919 B2 * | 5/2003 | Suga | B60N 2/14 296/65.07 |
| 6,666,514 B2 | 12/2003 | Muraishi et al. | |
| 6,739,281 B1 * | 5/2004 | Grimes | B63B 29/06 114/364 |
| 6,981,746 B2 | 1/2006 | Chung et al. | |
| 7,108,325 B2 | 9/2006 | Williamson et al. | |

(Continued)

FOREIGN PATENT DOCUMENTS

EP            3150426 A1      4/2017

*Primary Examiner* — D Glenn Dayoan
*Assistant Examiner* — Sunsurraye Westbrook
(74) *Attorney, Agent, or Firm* — David Coppiellie; Price Heneveld LLP (57) ABSTRACT

A network of rails for a vehicle includes a lateral rail that extends primarily along a lateral axis of the vehicle, a longitudinal rail that extends primarily along a longitudinal axis of the vehicle, and a circular rail that interacts with at least one of the lateral rail and the longitudinal rail.

19 Claims, 9 Drawing Sheets

(56) References Cited

U.S. PATENT DOCUMENTS

| | | | |
|---|---|---|---|
| 7,357,451 B2 | 4/2008 | Bendure et al. | |
| 7,399,035 B2 * | 7/2008 | Kusanagi | B60N 2/245 |
| | | | 296/65.07 |
| 7,422,264 B1 * | 9/2008 | Lung | B60N 2/06 |
| | | | 296/65.01 |
| 7,441,822 B1 | 10/2008 | Day | |
| 7,658,258 B2 | 2/2010 | Denney | |
| 7,950,740 B2 | 5/2011 | Benea et al. | |
| 8,459,742 B2 * | 6/2013 | Saint-Jaimes | B64D 11/0606 |
| | | | 297/344.24 |
| 8,998,326 B2 * | 4/2015 | DeCraene | B60N 2/14 |
| | | | 297/344.24 |
| 9,114,730 B1 | 8/2015 | Hudson et al. | |
| 10,144,516 B2 * | 12/2018 | Thomaschewski | |
| | | | B64D 11/0696 |
| 10,625,632 B2 * | 4/2020 | Jaradi | B60N 2/10 |
| 10,773,612 B2 * | 9/2020 | Dry | B60N 2/14 |
| 10,814,748 B2 * | 10/2020 | Akaike | B60N 2/01 |
| 2009/0021040 A1 * | 1/2009 | Yamasaki | B60N 2/062 |
| | | | 296/65.13 |
| 2009/0195037 A1 | 8/2009 | Plavetich et al. | |
| 2009/0243325 A1 * | 10/2009 | Villeminey | B60N 3/004 |
| | | | 296/65.09 |
| 2012/0032466 A1 * | 2/2012 | Line | B60N 2/24 |
| | | | 296/65.12 |
| 2013/0057014 A1 * | 3/2013 | Endt | B60N 2/0745 |
| | | | 296/65.11 |

* cited by examiner

NETWORK OF RAILS FOR A VEHICLE

FIELD OF THE DISCLOSURE

The present disclosure generally relates to a network of rails. More specifically, the present disclosure relates to a network of rails for a vehicle.

BACKGROUND OF THE INVENTION

Vehicles are often provided with seating assemblies that can be adjusted for occupant comfort. Some seating assemblies in vehicles are capable of translation in fore-aft or side-to-side directions. However, there is a need for reconfigurable seating assemblies in vehicles that are capable of translation to various locations within a cabin of the vehicle.

SUMMARY OF THE INVENTION

According to a first aspect of the present disclosure, a network of rails for a vehicle includes a lateral rail that extends primarily along a lateral axis of the vehicle, a longitudinal rail that extends primarily along a longitudinal axis of the vehicle, and a circular rail that interacts with at least one of the lateral rail and the longitudinal rail.

Embodiments of the first aspect of the present disclosure can include any one or a combination of the following features:
- the circular rail is positioned at one or more ends of at least one of the lateral rail and the longitudinal rail;
- the circular rail bisects at least one of the lateral rail and the longitudinal rail;
- the lateral rail, the longitudinal rail, and the circular rail are in a generally planar relationship with one another;
- a diameter of the circular rail generally corresponds with a distance between individual tracks of the lateral rail and a distance between individual tracks of the longitudinal rail;
- the network of rails further includes a seating assembly coupled to the network of rails, wherein the seating assembly is coupled to the network of rails by a plurality of anchors that are positioned to permit actuation along the lateral rail, the longitudinal rail, and the circular rail;
- the plurality of anchors are positioned to permit actuation along the lateral rail, the longitudinal rail, and the circular rail without adjusting a longitudinal position or a lateral position of the plurality of anchors relative to one another,
- the plurality of anchors are coupled to an underside of a pair of seat tracks; and
- the pair of seat tracks enable horizontal actuation of the seating assembly along the seat tracks relative to the plurality of anchors.

According to a second aspect of the present disclosure, a network of rails for a vehicle includes lateral rails that extend primarily along a lateral axis of the vehicle, longitudinal rails that extend primarily along a longitudinal axis of the vehicle, and circular rails that are positioned in a bisecting relationship at one or more ends of the lateral rails and the longitudinal rails.

Embodiments of the second aspect of the present disclosure can include any one or a combination of the following features:
- the lateral rails, the longitudinal rails, and the circular rails are in a generally planar relationship with one another,
- a diameter of the circular rails generally corresponds with a distance between the lateral rails and a distance between the longitudinal rails;
- the network of rails for a vehicle further including a seating assembly coupled to the network of rails;
- the seating assembly is coupled to the network of rails by a plurality of anchors that are positioned to permit actuation along the lateral rails, the longitudinal rails, and the circular rails;
- the plurality of anchors are positioned to permit actuation along the lateral rails, the longitudinal rails, and the circular rails without adjusting a longitudinal position or a lateral position of the plurality of anchors relative to one another,
- the plurality of anchors are coupled to an underside of a pair of seat tracks; and
- the pair of seat tracks enable horizontal actuation of the seating assembly along the seat tracks relative to the plurality of anchors.

According to a third aspect of the present disclosure, a network of rails for a vehicle includes lateral rails that extend along a lateral axis of the vehicle, longitudinal rails that extend along a longitudinal axis of the vehicle, and circular rails positioned in a bisecting relationship at one or more ends of the lateral rails and the longitudinal rails. A seating assembly is coupled to the network of rails by a plurality of anchors that are positioned to permit actuation along the network of rails.

Embodiments of the third aspect of the present disclosure can include any one or a combination of the following features:
- a diameter of the circular rails generally corresponds with a distance between the lateral rails, a distance between the longitudinal rails, and a distance between the plurality of anchors; and
- the plurality of anchors are positioned to permit actuation along the lateral rails, the longitudinal rails, and the circular rails without adjusting a longitudinal position or a lateral position of the plurality of anchors relative to one another.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
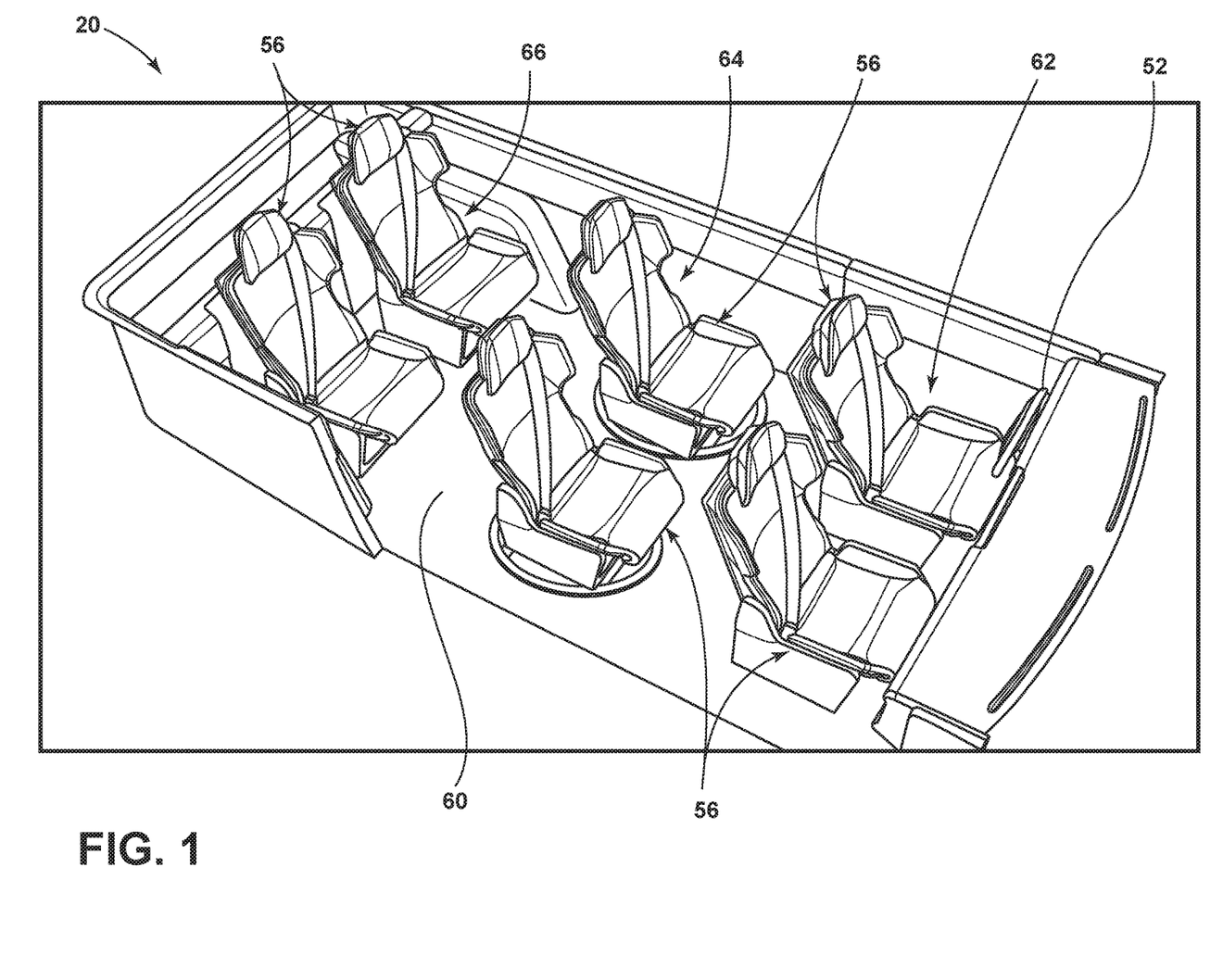
FIG. 1 is a side perspective view of an interior of a vehicle, illustrating first, second, and third rows of seating assemblies, according to one example.
Figure 2:
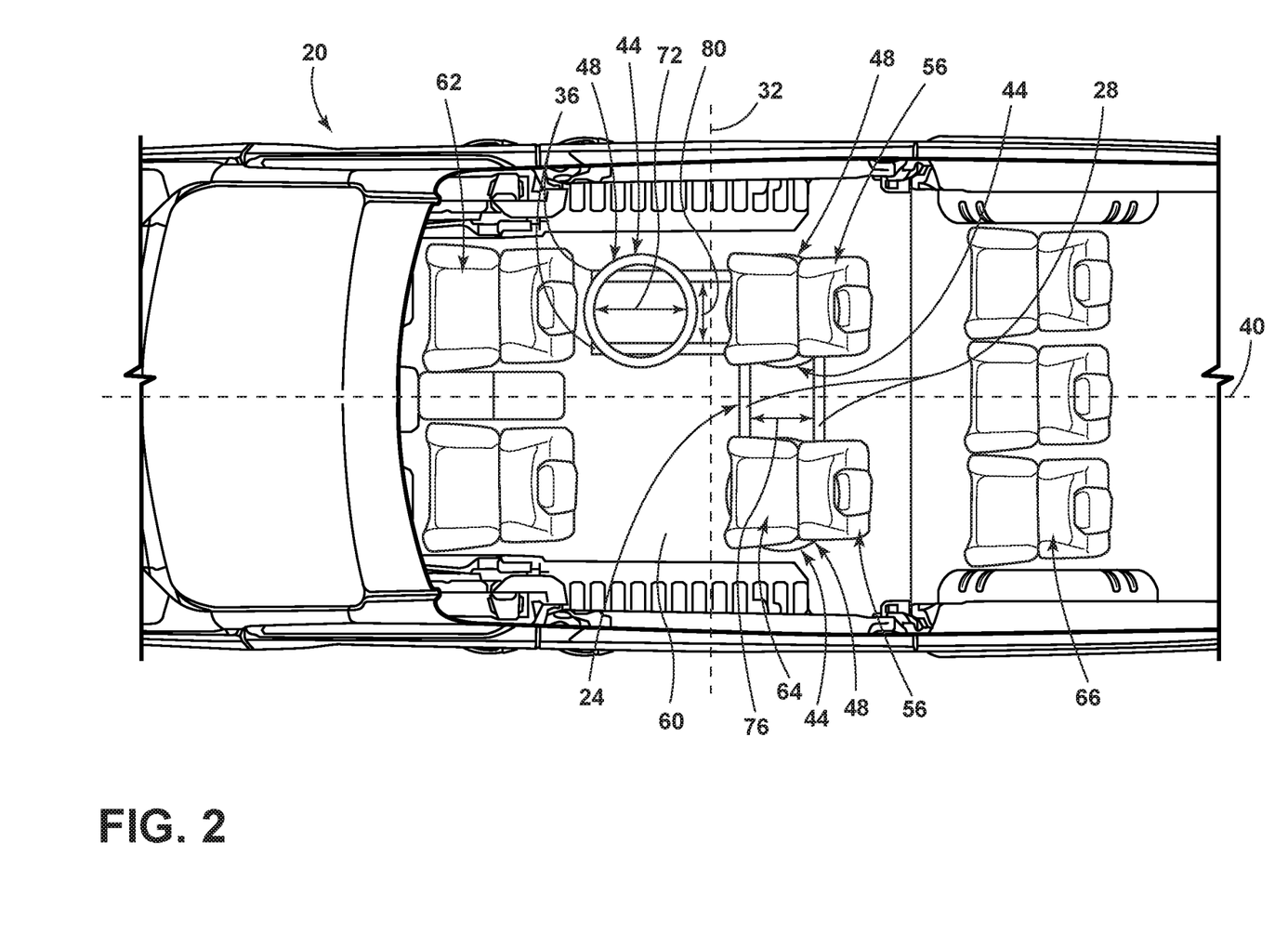
FIG. 2 is a top view of the interior of the vehicle, illustrating a network of rails, according to one example.
Figure 3:
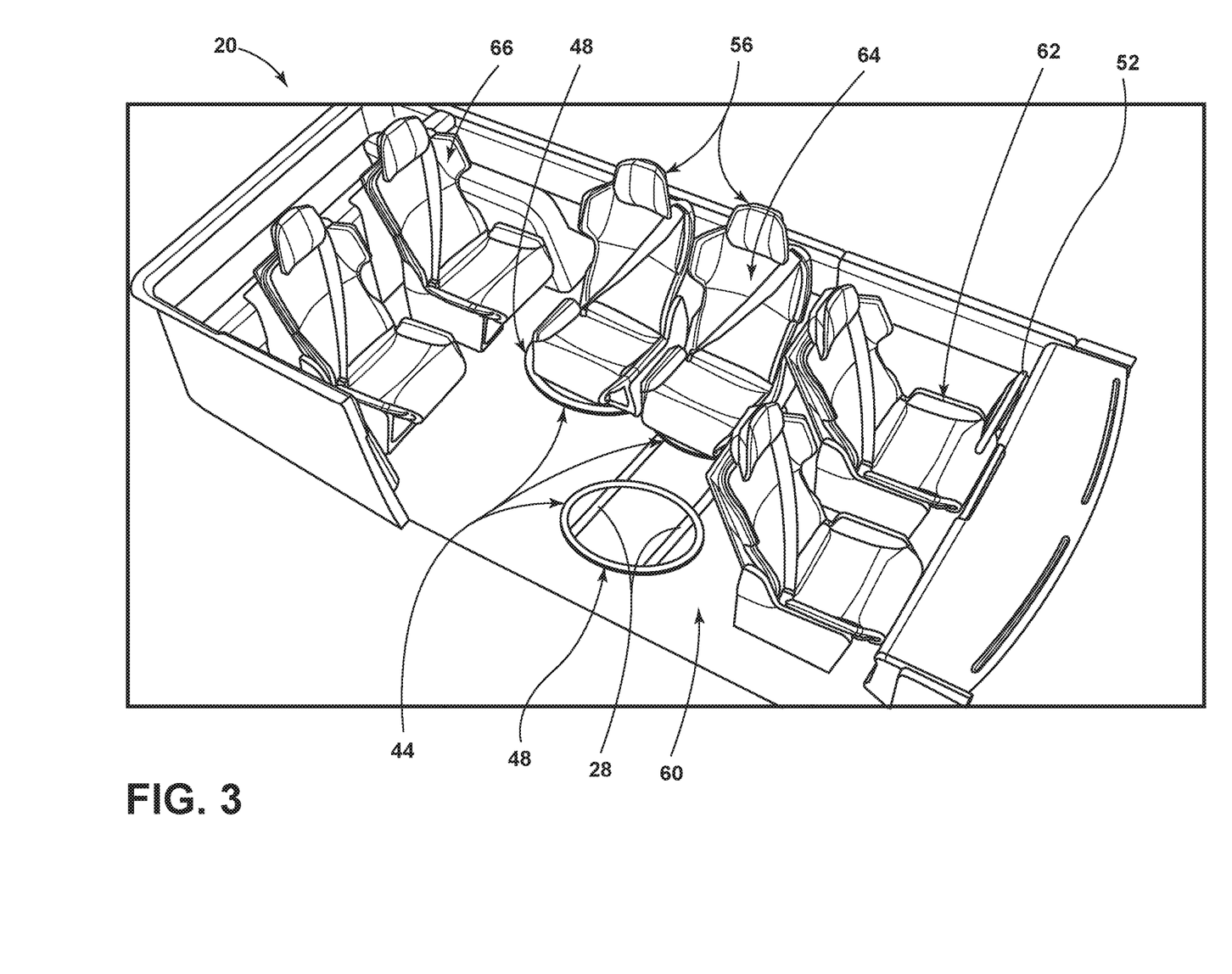
FIG. 3 is a side perspective view of the interior of the vehicle, illustrating a side-facing orientation for the second row of seating assemblies, according to one example.
Figure 4:
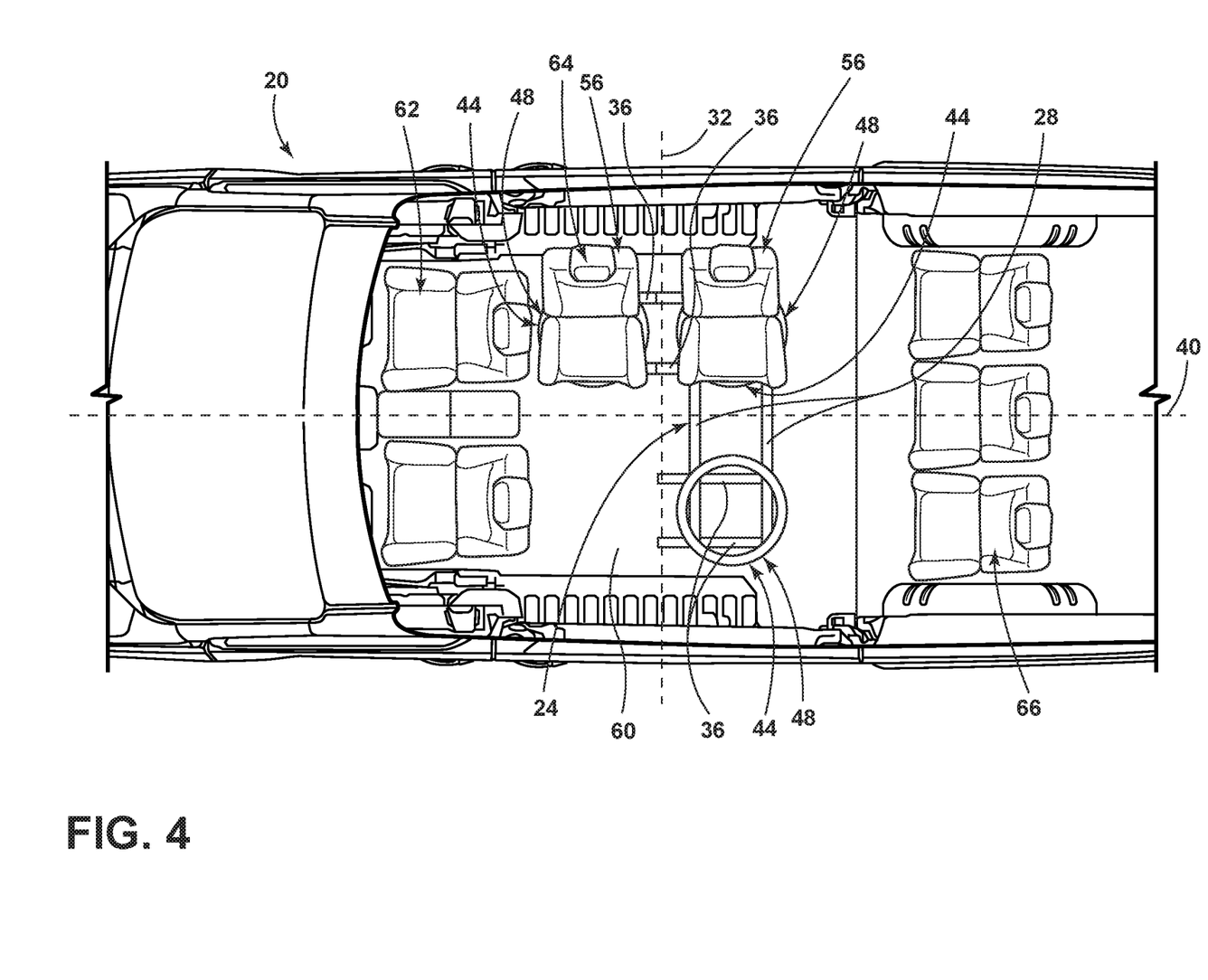
FIG. 4 is a top view of the interior of the vehicle, illustrating the seating assemblies actuated to the side-facing orientation along the network of rails, according to one example.
Figure 5:
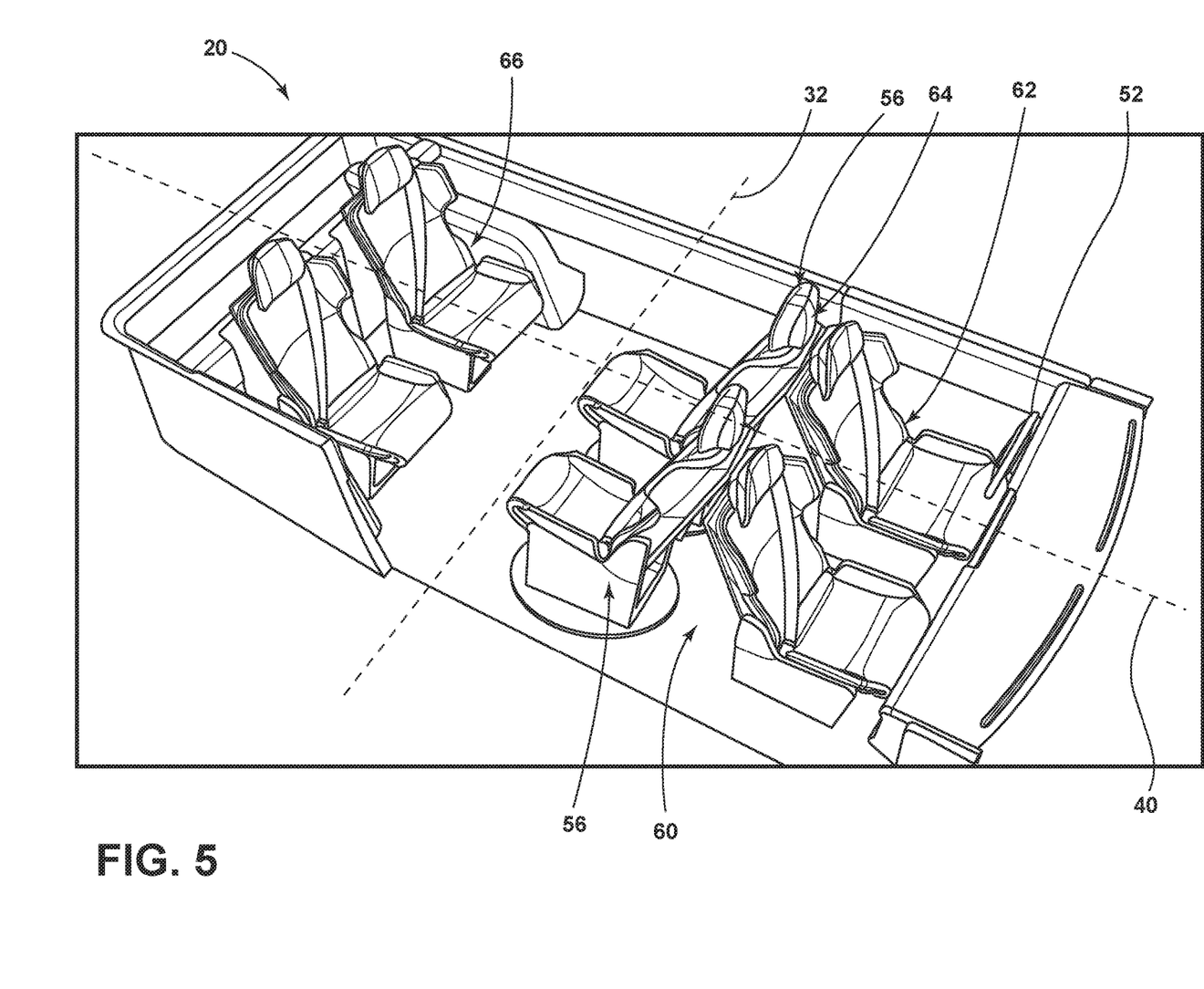
FIG. 5 is a side perspective view of the interior of the vehicle, illustrating a rear-facing orientation for the second row of seating assemblies, according to one example.
Figure 6:
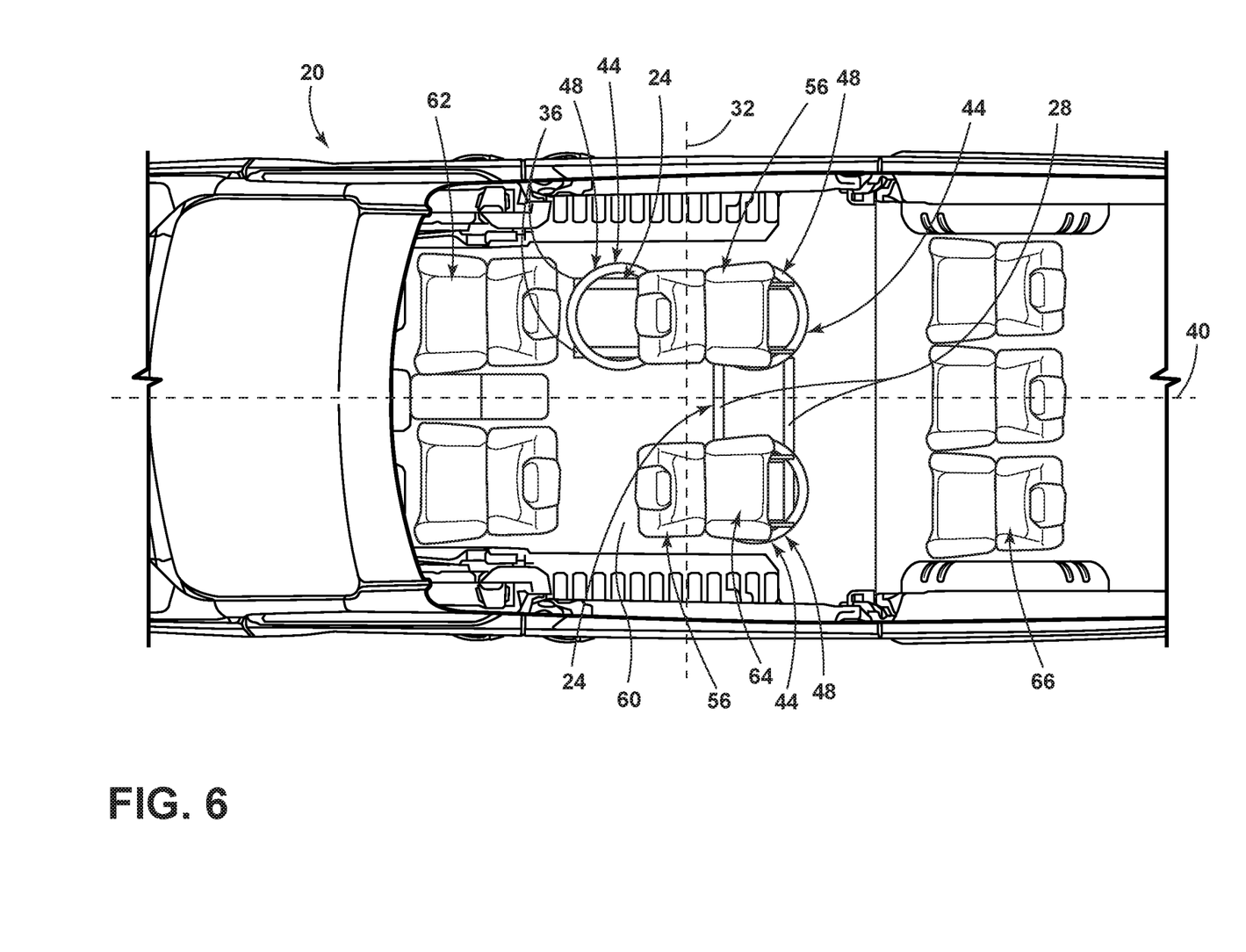
FIG. 6 is a top view of the interior of the vehicle, illustrating the seating assemblies in the rear-facing orientation for the second row of seating assemblies, according to one example.
Figure 7:
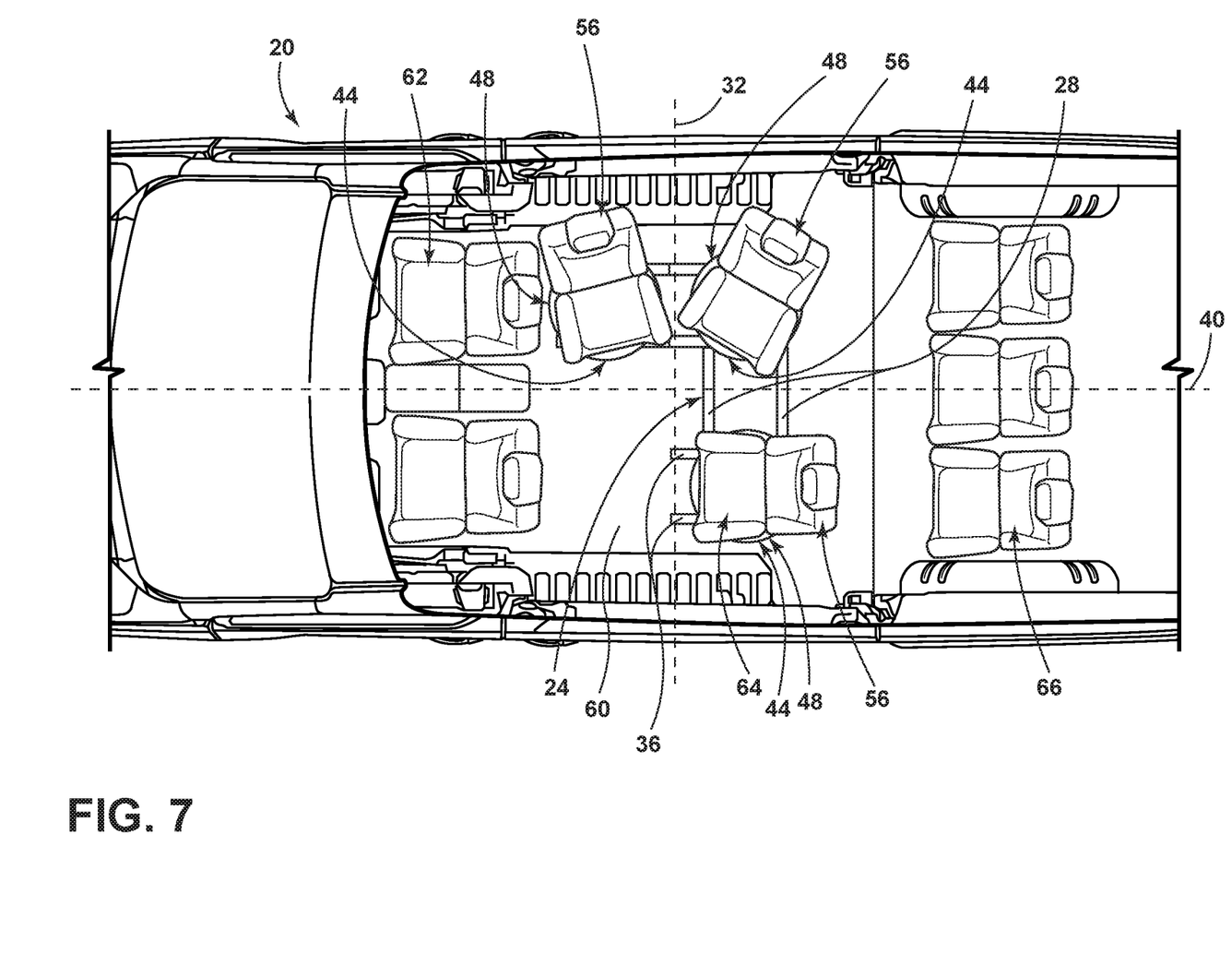
FIG. 7 is a top view of the interior of the vehicle, illustrating a conversation orientation for the second row of seating assemblies, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a network of rails for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-10B, a vehicle is generally designated by numeral 20. A network of rails 24 for the vehicle 20 includes lateral rails 28 that extend primarily along a lateral axis 32 of the vehicle 20. The network of rails 24 also includes longitudinal rails 36 that extend primarily along a longitudinal axis 40 of the vehicle 20. The network of rails 24 may further include circular rails 44 that are positioned at one or more ends 48 of the lateral rails 28 and the longitudinal rails 36. In some examples, one or more of the circular rails 44 may be positioned at one or more junctions between the lateral and longitudinal rails 28, 36. In various examples, one or more of the circular rails 44 can be provided at an intermediate location along a length of the lateral rails 28 and/or the longitudinal rails 36. In some examples, the lateral rails 28 may be omitted such that the vehicle 20 is provided with one or more longitudinal rails 36 that are each optionally equipped with one or more of the circular rails 44. Alternatively, the longitudinal rails 36 may be omitted such that the vehicle 20 is provided with one or more lateral rails 28 that are each optionally equipped with one or more of the circular rails 44.

Figure 8:
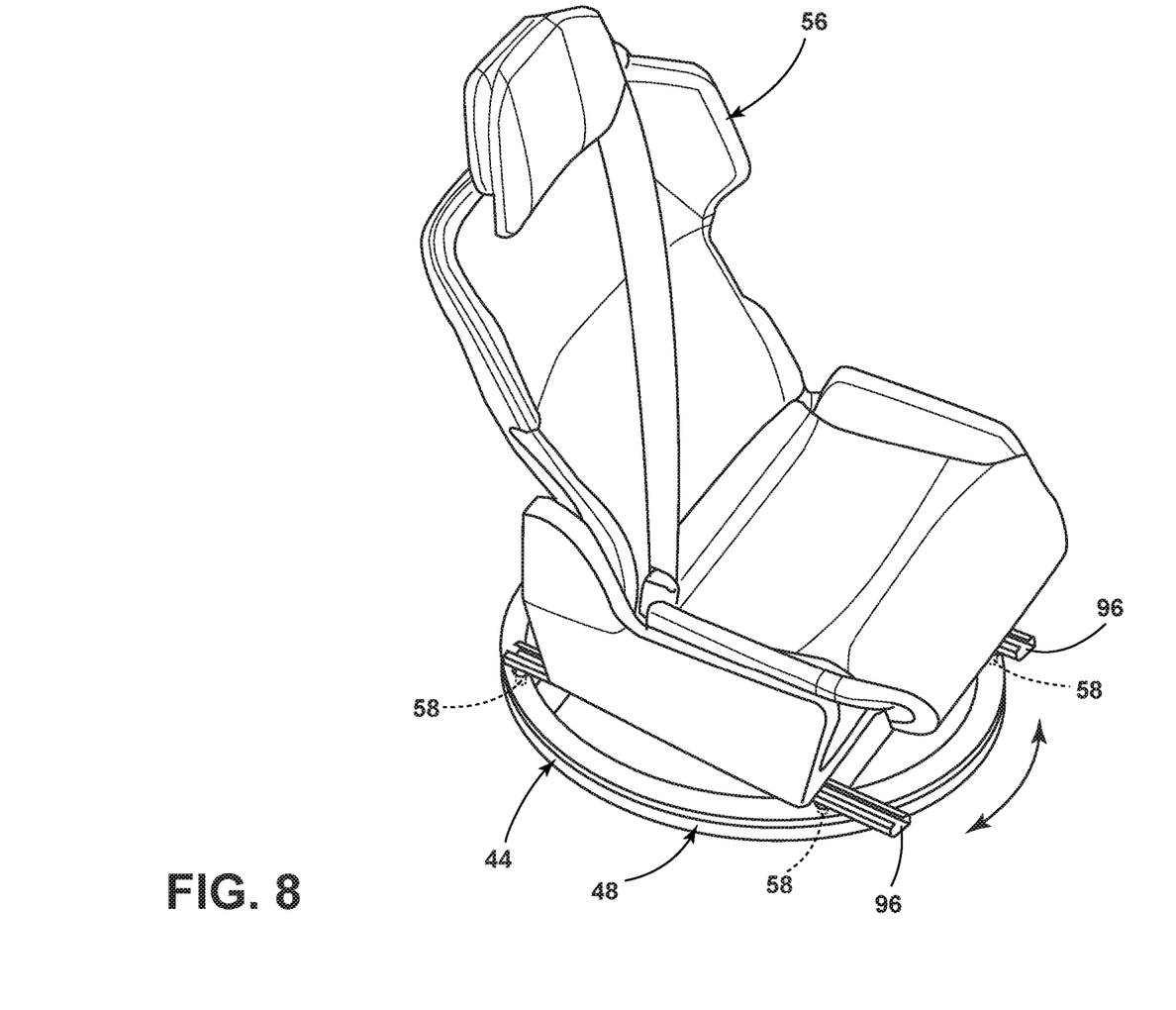
FIG. 8 is a side perspective view of the seating assembly, illustrating a coupling of the seating assembly, a pair of seat tracks, and a circular rail of the network of rails, according to one example.
Figure 9A:
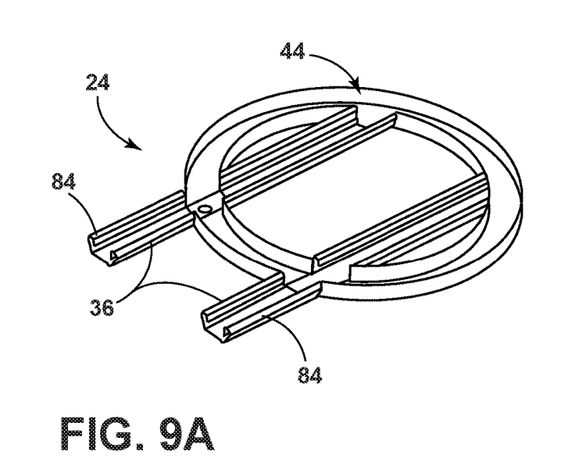
FIG. 9A is a side perspective view of a junction between the circular rail and a longitudinal rail, according to one example.
Figure 9B:
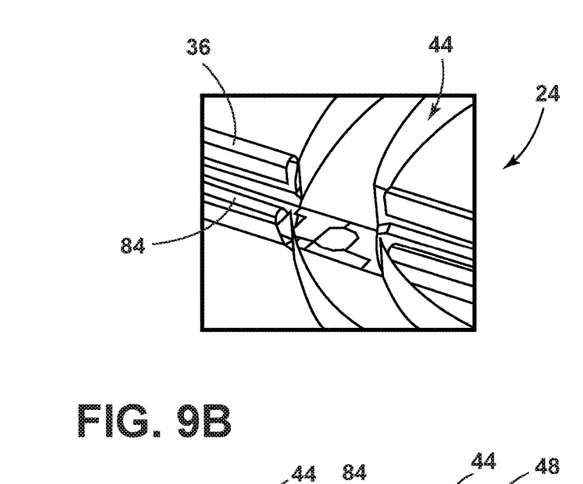
FIG. 9B is an expanded view of the junction between the circular rail and the longitudinal rail, illustrating a bisecting arrangement of the circular rail and the longitudinal rail, according to one example.
Figure 10A:
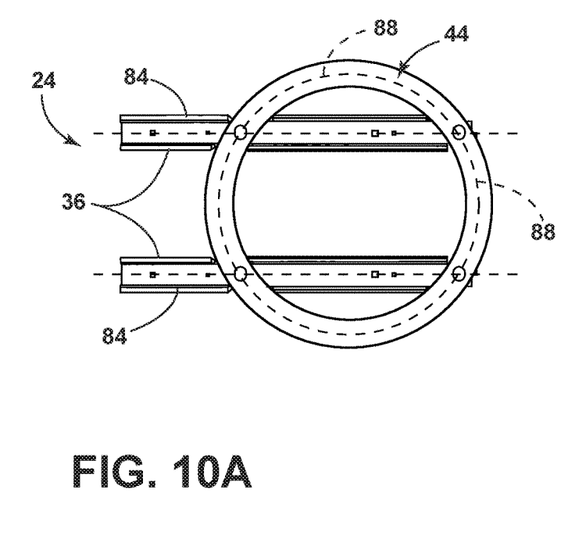
FIG. 10A is a top view of the junction between the circular rail and the longitudinal rail, according to one example.
Figure 10B:
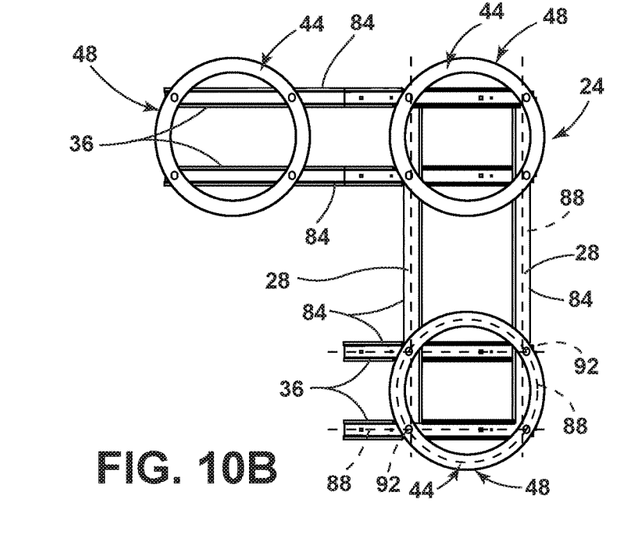
FIG. 10B is a top view of the network or rails, illustrating an interaction between a lateral rail, the longitudinal rail, and a plurality of the circular rails, according to one example.

Referring again to FIGS. 1-7, the vehicle 20 may be passenger driven, semi-autonomous, fully autonomous, or any combination of user-controlled and automated. For example, the semi-autonomous example of the vehicle 20 may perform many or all-commuting functions (e.g., accelerating, braking, turning, signaling, etc.) independent of user interaction while the user maintains override control of the vehicle 20. Accordingly, in some examples, the vehicle 20 may be provided with a steering wheel 52 that is positioned proximate to one of a plurality of seating assemblies 56. The seating assemblies 56 may be configured to provide various functionality to an interior or cabin of the vehicle 20. For example, the seating assemblies 56 may be utilized to support a user in a seated position. Additionally or alternatively, the seating assemblies 56 may be folded to provide an ottoman, a work surface, a table, or the like. The seating assemblies 56 are coupled to the network of rails 24. In various examples, the seating assemblies 56 can be coupled to the network of rails 24 by a plurality of anchors 58 (FIG. 8). The anchors 58 can be positioned to permit actuation along the lateral rails 28, the longitudinal rails 36, and the circular rails 44. In some examples, the plurality of anchors 58 are positioned to permit actuation along the lateral rails 28, the longitudinal rails 36, and the circular rails 44 without adjusting a longitudinal position or a lateral position of the plurality of anchors 58 relative to one another. Said another way, the anchors 58 on an individual seating assembly 56, in some examples, may remain fixed relative to one another in the lateral and longitudinal directions. While the anchors 58 may be fixed relative to one another, that does not exclude the ability of the anchors 58 to move within the network of rails 24 and/or be provided with components that are movable (e.g., rollers, wheels, locking pins, etc.), as will be discussed in more detail herein.

Referring further to FIGS. 1-7, the lateral rails 28 and the longitudinal rails 36 can connect with one another at an angle at junctions between the lateral rails 28 and the longitudinal rails 36 (e.g., one or more of the ends 48). For example, the lateral rails 28 and the longitudinal rails 36 may meet at an angle of about ninety degrees (90°) to define the junctions. Alternatively, the lateral rails 28 and the longitudinal rails 36 may meet at angles that are greater than or less than about ninety degrees (90°) without departing from the concepts disclosed herein. The circular rail 44 can be positioned at one or more of the junctions or ends 48 between the lateral and longitudinal rails 28, 36. In the depicted examples, the circular rails 44 are positioned at the ends 48 of the lateral rails 28 and the longitudinal rails 36. By providing the circular rails 44 in the network of rails 24, the desirable functionality enabled by the circular rail 44 of permitting the seating assemblies 56 to rotate about a vertical axis is provided to multiple seating assemblies 56 simultaneously and at-will. Said another way, when the seating assemblies 56 are positioned in a co-localized manner with one of the circular rails 44, each of the seating assemblies 56 can rotate about their own vertical axis independent of the position and orientation of the remaining seating assemblies 56. In general, the lateral rails 28, the longitudinal rails 36, and the circular rails 44 are in a generally planar relationship with one another. Said another way, the network of rails 24, which includes the lateral rails 28, the longitudinal rails 36, and the circular rails 44, are configured to have corresponding heights and thicknesses to enable smooth and seamless transfer of the seating assemblies 56 and their associated anchors 58 throughout the extent of the network of rails 24 without resulting in binding or sticking of the anchors 58 within the network of rails 24.

Referring still further to FIGS. 1-7, the network of rails 24 can be positioned throughout the interior of the vehicle 20. For example, the network of rails 24 can generally extend from a forward extent of a floor 60 of the interior of the vehicle 20 to a reward extent of the floor 60 of the interior of the vehicle 20. In alternative examples, the network of rails 24 can be positioned in less than the entirety of the floor 60 of the vehicle 20. For example, the network of rails 24 can be positioned in a region of the floor 60 that is typically referred to as a first row 62, a second row 64, and/or a third row 66 of the vehicle 20. In the depicted examples, the network of rails 24 is positioned in the second row 64 and is configured to enable lateral, longitudinal, and rotational movement of the seating assemblies 56 within the interior of the vehicle 20. Accordingly, occupants of the seating assemblies 56 can arrange themselves in forward-facing, rearward-facing, and/or side-facing orientations to enable easier conversation between occupants, allow themselves to view scenery out of various windows provided in the vehicle 20, and create greater cargo room on a surface area of the floor 60 while maintaining the seating capacity of the vehicle 20. In various examples, the network of rails 24 is equipped with a plurality of seating assemblies 56 coupled thereto. Transitioning one of the seating assemblies 56 from a front-facing position to a rear-facing position can be accomplished by actuating the seating assembly 56 laterally along the lateral rail 28 toward one of the circular rails 44. Next, the seating assembly 56 can be halted at the junction or end 48 that contains the circular rail 44. At the junction or end 48 that has the circular rail 44, the circular rail 44 bisects the lateral rails 28 and the longitudinal rails 36. Accordingly, when the seating assembly 56 is properly positioned at the junction or end 48 having the circular rail 44, the seating assembly 56 may be transitioned from the lateral rail 28 to either the longitudinal rail 36 or the circular rail 44 with equal ease by actuating the seating assembly 56 either toward or along the longitudinal rail 36 or rotating the seating assembly 56 about a vertical axis defined by a center point of the circular rail 44. Once the seating assembly 56 has been transitioned to the circular rail 44, the seating assembly 56 can be rotated to the desired orientation about the vertical axis defined by the center point of the circular rail 44. The seating assembly 56, having a different rotational orientation, can remain co-localized with the circular rail 44 or can be transitioned to the longitudinal rail 36 to assume another location within the vehicle 20. A diameter 72 of the circular rail 44 can generally corresponds with a distance 76 between the lateral rails 28 and a distance 80 between the longitudinal rails 36. Accordingly, as the seating assemblies 56 are transitioned between the lateral rails 28, the longitudinal rails 36, and the circular rails 44, binding or catching of the anchors 58 at the junctions or ends 48 is avoided, thereby providing a smooth operation and actuation of the seating assemblies 56 along the network of rails 24 to a variety of seating positions and seating orientations. It is contemplated that the angular orientation of the lateral rails 28, the longitudinal rails 36, and the circular rails 44 may have an impact on the rotational orientations of the seating assemblies 56 that can successfully transition between the entirety of the network of rails 24. For example, in the depicted example, the seating assemblies 56 may be limited to rotational orientations that are separated by about ninety degrees (90°) to ensure proper alignment of the anchors 58 with the lateral and longitudinal rails 28, 36.

Referring now to FIGS. 8-10B, the junction or ends 48 where the lateral rails 28, the longitudinal rails 36, and the circular rails 44 interact with one another are shown. In various examples, the lateral rails 28 and the longitudinal rails 36 intersect or bisect one another at an angle. For example, the lateral rails 28 and the longitudinal rails 36 can intersect at an angle that is greater than about zero degrees (0°), greater than about fifteen degrees (15°), greater than about thirty degrees (30°), greater than about forty five degrees (45°), greater than about sixty degrees (60°), about ninety degrees (90°), at least about ninety degrees (90°), less than about one-hundred-twenty degrees (120°), less than about one-hundred-eighty degrees (180°), and/or combinations or ranges thereof, including individual values. As stated above, it is contemplated that the angular relationship or orientation of the lateral rails 28, the longitudinal rails 36, and/or the circular rails 44 can have an impact on which angular orientations of the seating assembly 56 (FIG. 2) can successfully transition between the lateral rails 28, the longitudinal rails 36, and/or the circular rails 44. Additionally, the angular relationship or orientation of the lateral rails 28 and the longitudinal rails 36 can affect the positioning of the anchors 58. In the depicted examples, the lateral rails 28 and the longitudinal rails 36 are arranged with an angular orientation relative to one another of about ninety degrees (90°) and a spacing between individual tracks 84 of the lateral rails 28 and the longitudinal rails 36 is maintained at about equivalent distances. Accordingly, the anchors 58 can be positioned as an appropriately sized square such that the anchors 58 can transition, without lateral or longitudinal adjustment, between the lateral rails 28 and the longitudinal rails 36. Additionally, the diameter 72 of the circular rail 44 is sized such that the anchors 58 can transition into and out of the circular rail 44 from the lateral rails 28 and the longitudinal rails 36 without lateral or longitudinal adjustment of the anchors 58 relative to one another. In examples where the angular orientation or relationship of the lateral rails 28 and the longitudinal rails 36 are greater than or less than about ninety degrees (90°), the spacing of the anchors 58 relative to one another may take on alternative geometries to the square geometry described above. Additionally or alternatively, in examples where the angular orientation or relationship of the lateral rails 28 and the longitudinal rails 36 are greater than or less than about ninety degrees (90°), the anchors 58 may be provided with an ability to adjust their position relative to one another in the lateral and longitudinal directions to facilitate transitions of the seating assembly 56 between the lateral rails 28, the longitudinal rails 36, and the circular rails 44. It is contemplated that in examples where the angular orientation or relationship of the lateral rails 28 and the longitudinal rails 36 are greater than or less than about ninety degrees (90°), the circular rail 44 may be provided as an oblong geometry or another generally circular or angular geometry that is capable of facilitating the transitions between the lateral rails 28 and the longitudinal rails 36 while maintaining the functionality of enabling rotation of the seating assembly 56 about the vertical axis. Regardless of the angular orientation of the lateral rails 28 relative to the longitudinal rails 36, it can be beneficial for a centerline 88 of the widths of the individual tracks 84 of the lateral rail 28, the longitudinal rail 36, and the circular rail 44 to intersect with one another at the junction or ends 48 such that the anchors 58 can transition along the entirety of the network of rails 24. The points at which the centerlines 88 of the widths of the individual tracks 84 of the lateral rails 28, the longitudinal rails 36, and the circular rail 44 intersect with one another may be referred to as convergence points 92.

Referring again to FIGS. 8-10B, in some examples, the anchors 58 may be coupled to an underside of a pair of seat tracks 96. The seat tracks 96 can enable horizontal actuation of the seating assembly 56 along the seat tracks 96 relative to the plurality of anchors 58. Accordingly, the seating assemblies 56 of the present disclosure are provided with a large degree of freedom in positioning and orienting the seating assemblies 56 within the interior of the vehicle 20. Providing the additional horizontal actuation that is enabled by the seat tracks 96 can be particularly advantageous for when users orient the seating assemblies 56 in conversational orientations where the seating assemblies 56 are arranged and rotated to face one another rather than remaining substantially parallel to one another and forward-facing. Orientations that take into account multiple seating assemblies 56 (e.g., conversational orientations) may be referred to as macro-orientations. For example, with the users more directly facing one another, either within the same row of seats or between rows of seats, the legs of the users can have a tendency to occupy similar or the same general areas such that the users legs may come into contact, thereby making the users feel cramped, uncomfortable, or generally dissatisfied. In such situations, the users can actuate their seating assemblies 56 along the seat tracks 96 to space themselves further apart (e.g., radially further from a center point of the conversational macro-orientation) to enhance space and user comfort.

Referring further to FIGS. 8-10B, the anchors 58 can be provided with movable components, such as rollers, wheels, locking pins, and the like. Rollers and/or wheels can be utilized to decrease a coefficient of friction related to the slidable actuation of the seating assemblies 56 along the network of rails 24. The rollers and/or wheels can be provided with the ability to swivel, caster, or generally travel in multiple directions such that the anchors 58 can more easily transition between the various directions of travel while constantly providing the decreased coefficient of friction. The anchors 58, when provided with locking pins, can be movably secured to the network of rails 24 such that the seating assemblies 56 remain in the desired location and are prevented from unintentional movement during an impact event (e.g., vehicle-to-vehicle collisions or vehicle-to-object collisions). In the depicted examples of the network of rails 24, the network of rails 24 includes a singular lateral rail 28, a singular longitudinal rail 36, and a plurality of circular rails 44 provided at the junctions or ends 48 of the lateral and longitudinal rails 28, 36. While the lateral and longitudinal rail 28, 36 are referred to as singular, that does not mean that the lateral rail 28 and the longitudinal rail 36 cannot be made of multiple parts or sections that together are assembled to a final configuration that results in a single path from side-to-side and from front-to-back for the network of rails 24. Such an arrangement for the network of rails 24 may be referred to as an "L-shaped" arrangement. The L-shaped arrangement can be beneficial in improving ingress and egress to the area of the vehicle 20 that is equipped with the network of rails 24. It is contemplated that alternative arrangements and geometries are possible for the network of rails 24 without departing from the concepts disclosed herein. For example, the network of rails 24 may be provided with "U-shaped" arrangements, "H-shaped" arrangements, and other arrangements that generally provide the network of rails 24 throughout the interior of the vehicle 20 with a plurality of paths from side-to-side and/or from front-to-back for the seating assemblies 56.

The present disclosure provides a well-integrated network of rails 24 that enable lateral, longitudinal, and rotational actuation of seating assemblies 56 such that users are provided with greater freedom in the arrangement of the interior of the vehicle 20. Actuation of the seating assemblies 56 can be accomplished by manual or powered movement. Additionally, the present disclosure provides the ability of the seating assemblies 56 to be rotated about their own vertical axes independent of the position and orientation of the remaining seating assemblies 56 that are coupled to the network of rails 24.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A network of rails for a vehicle, comprising:
   a lateral rail that extends primarily along a lateral axis of the vehicle;
   a longitudinal rail that extends primarily along a longitudinal axis of the vehicle; and
   a circular rail that bisects at least one of the lateral rail and the longitudinal rail.

2. The network of rails for a vehicle of claim 1, wherein the circular rail is positioned at one or more ends of at least one of the lateral rail and the longitudinal rail.

3. The network of rails for a vehicle of claim 1, wherein the lateral rail, the longitudinal rail, and the circular rail are in a generally planar relationship with one another.

4. The network of rails for a vehicle of claim 1, wherein a diameter of the circular rail generally corresponds with a distance between individual tracks of the lateral rail and a distance between individual tracks of the longitudinal rail.

5. The network of rails for a vehicle of claim 4, further comprising:
   a seating assembly coupled to the network of rails, wherein the seating assembly is coupled to the network of rails by a plurality of anchors that are positioned to permit actuation along the lateral rail, the longitudinal rail, and the circular rail.

6. The network of rails for a vehicle of claim 5, wherein the plurality of anchors are positioned to permit actuation along the lateral rail, the longitudinal rail, and the circular rail without adjusting a longitudinal position or a lateral position of the plurality of anchors relative to one another.

7. The network of rails for a vehicle of claim 5, wherein the plurality of anchors are coupled to an underside of a pair of seat tracks.

8. The network of rails for a vehicle of claim 7, wherein the pair of seat tracks enable horizontal actuation of the seating assembly along the seat tracks relative to the plurality of anchors.

9. A network of rails for a vehicle, comprising:
   lateral rails that extend primarily along a lateral axis of the vehicle;
   longitudinal rails that extend primarily along a longitudinal axis of the vehicle; and
   circular rails that are positioned in a bisecting relationship at one or more ends of the lateral rails and the longitudinal rails.

10. The network of rails for a vehicle of claim 9, wherein the lateral rails, the longitudinal rails, and the circular rails are in a generally planar relationship with one another.

11. The network of rails for a vehicle of claim 9, wherein a diameter of the circular rails generally corresponds with a distance between the lateral rails and a distance between the longitudinal rails.

12. The network of rails for a vehicle of claim 11, further comprising a seating assembly coupled to the network of rails.

13. The network of rails for a vehicle of claim 12, wherein the seating assembly is coupled to the network of rails by a plurality of anchors that are positioned to permit actuation along the lateral rails, the longitudinal rails, and the circular rails.

14. The network of rails for a vehicle of claim 13, wherein the plurality of anchors are positioned to permit actuation along the lateral rails, the longitudinal rails, and the circular rails without adjusting a longitudinal position or a lateral position of the plurality of anchors relative to one another.

15. The network of rails for a vehicle of claim 13, wherein the plurality of anchors are coupled to an underside of a pair of seat tracks.

16. The network of rails for a vehicle of claim 7, wherein the pair of seat tracks enable horizontal actuation of the seating assembly along the seat tracks relative to the plurality of anchors.

17. A network of rails for a vehicle, comprising:
lateral rails extending along a lateral axis of the vehicle;
longitudinal rails extending along a longitudinal axis of the vehicle;
circular rails positioned in a bisecting relationship at one or more ends of the lateral rails and the longitudinal rails; and
a seating assembly coupled to the network of rails by a plurality of anchors that are positioned to permit actuation along the network of rails.

18. The network of rails for a vehicle of claim 17, wherein a diameter of the circular rails generally corresponds with a distance between the lateral rails, a distance between the longitudinal rails, and a distance between the plurality of anchors.

19. The network of rails for a vehicle of claim 17, wherein the plurality of anchors are positioned to permit actuation along the lateral rails, the longitudinal rails, and the circular rails without adjusting a longitudinal position or a lateral position of the plurality of anchors relative to one another.

* * * * *